United States Patent
Kloiber et al.

(10) Patent No.: US 12,160,316 B2
(45) Date of Patent: Dec. 3, 2024

(54) METHOD, COMPUTER READABLE MEDIUM AND GATEWAY DEVICE FOR COORDINATING BETWEEN A PLURALITY OF WIRELESS NETWORKS

(71) Applicant: Siemens Aktiengesellschaft, Munich (DE)

(72) Inventors: Bernhard Kloiber, Waldkirchen (DE); Björn Richerzhagen, Ingolstadt (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 357 days.

(21) Appl. No.: 17/786,634

(22) PCT Filed: Dec. 2, 2020

(86) PCT No.: PCT/EP2020/084194
§ 371 (c)(1),
(2) Date: Jun. 17, 2022

(87) PCT Pub. No.: WO2021/121988
PCT Pub. Date: Jun. 24, 2021

(65) Prior Publication Data
US 2023/0073294 A1 Mar. 9, 2023

(30) Foreign Application Priority Data
Dec. 20, 2019 (EP) .................................. 19218728

(51) Int. Cl.
*H04L 1/08* (2006.01)
*H04L 1/18* (2023.01)
(Continued)

(52) U.S. Cl.
CPC .............. *H04L 1/08* (2013.01); *H04L 1/1887* (2013.01); *H04L 1/1893* (2013.01); *H04W 88/16* (2013.01)

(58) Field of Classification Search
CPC ....... H04L 1/08; H04L 1/1887; H04L 1/1893; H04L 45/24; H04W 88/16
(Continued)

(56) References Cited

U.S. PATENT DOCUMENTS 10,440,734 B2 * 10/2019 Sun ........................ H04L 5/0051
2005/0078616 A1 * 4/2005 Nevo ..................... H04W 48/18
370/278

(Continued)

FOREIGN PATENT DOCUMENTS

| EP | 1232607 | 8/2002 |
| EP | 3364703 | 8/2018 |

(Continued)

OTHER PUBLICATIONS

PCT International Search Report dated May 2, 2021 based on PCT/EP2020/084194 filed Dec. 2, 2020.

*Primary Examiner* — Candal Elpenord
(74) *Attorney, Agent, or Firm* — Cozen O'Connor

(57) ABSTRACT

A gateway device for coordinating between a wireless base station of a first network and a wireless access controller of second network includes a first network interface capable of being connected to the wireless base station and a second network interface capable of being connected to the wireless access controller, where a scheduler is configured to schedule transmission of a plurality of packets based on transmission criterion associated with one or more packets from the plurality of packets.

9 Claims, 5 Drawing Sheets

(51) Int. Cl.
*H04L 1/1867* (2023.01)
*H04W 88/16* (2009.01)

(58) Field of Classification Search
USPC .................................................. 370/329–330
See application file for complete search history.

(56) References Cited

U.S. PATENT DOCUMENTS

| | | | |
|---|---|---|---|
| 2010/0135232 A1* | 6/2010 | Fan ...................... | H04L 47/283 370/329 |
| 2011/0034175 A1* | 2/2011 | Fong ..................... | H04L 5/0032 455/450 |
| 2011/0280226 A1 | 11/2011 | Lennvall et al. | |
| 2012/0250494 A1* | 10/2012 | Rong .................... | H04L 47/522 370/216 |
| 2015/0098415 A1* | 4/2015 | Chen .................... | H04L 5/0057 370/329 |
| 2016/0036571 A1* | 2/2016 | Park ..................... | H04L 5/0048 370/330 |
| 2016/0192382 A1* | 6/2016 | Soldati ................ | H04W 72/542 370/329 |
| 2017/0127409 A1 | 5/2017 | Mishra et al. | |
| 2018/0332479 A1* | 11/2018 | Chai ..................... | H04W 76/15 |

FOREIGN PATENT DOCUMENTS

| | | |
|---|---|---|
| WO | 2014160763 | 10/2014 |
| WO | 2014179319 | 11/2014 |

\* cited by examiner

METHOD, COMPUTER READABLE MEDIUM AND GATEWAY DEVICE FOR COORDINATING BETWEEN A PLURALITY OF WIRELESS NETWORKS

CROSS-REFERENCE TO RELATED APPLICATIONS

This is a U.S. national stage of application No. PCT/EP2020/084194 filed 2 Dec. 2020. Priority is claimed on European Application No. 19218728.4 filed 20 Dec. 2019, the content of which is incorporated herein by reference in its entirety.

BACKGROUND OF THE INVENTION

1. Field of the Invention

The present disclosure relates to coordination amongst a plurality of wireless networks and, more particularly, relates to industrial networks deployed in an industrial environment that comprise a plurality of network devices, servers and/or automation devices, and are responsible for communication of industrial data in relation to the various processes in the industrial environment, where the industrial networks accordingly have strict requirements in relation network reliability and communication latency.

2. Description of the Related Art

With the introduction of 5G Non-Public Networks (NPNs), heterogeneous networks involving a plurality of wireless radio networks are expected to play a crucial in industrial communication and automation networks. In factory automation, for instance, 5G telephony is expected to enhance existing (legacy) communication infrastructure. Accordingly, 5G networks may coexist with other existing wireless communication systems.

Especially with 5G New Radio Unlicensed (NR-U), 5G networks will be able to work in unlicensed ISM bands, and thus, 5G networks may have to share the wireless radio resources together with WLAN networks existing in the industrial plant or facility. Enabling the use of unlicensed spectrum for 5G in NPNs is highly desirable because there are no additional costs for license fees. However, such parallel deployment of 5G and WLAN networks using the same shared spectrum would lead to negative effects, such as interferences and disturbances, and would negatively affect other factors such as communication latency, and/or reliability.

Conventionally, in the context of cellular mobile communications, such inter-network interferences have been handled by a plurality of techniques. In one such technique, in order to enable fair coexistence between 4G/5G and WLAN in an unlicensed spectrum, A Listen Before Talk (LBT) mechanism is utilized (as proposed for NR-U and MuLTEfire). However, usage of LBT does not provide for deterministic communication, and by implication is not well suited for critical communication in relation to industrial control.

Another such technique relates to LTE WLAN Aggregation (LWA). LWA is a feature that has been introduced in 3GPP Rel-13 and primarily follows the LTE DC architecture using a cellular and a non-cellular RAT. Some reference documents describing the operation of LWA include WO 2014/179319A1, and WO 2014/160763A1. However, within LWA, WLAN cannot operate by itself. The packets transmitted via WLAN are PDCP PDUs encapsulated into the LWAAP (LWA Adaptation Protocol). Thus, WLAN in LWA always requires the LTE part (i.e., involvement of the base station). Accordingly, there is a need for a method and device for joint coordination between 4G/5G and WLAN technology which addresses the aspects mentioned above.

SUMMARY OF THE INVENTION

In view of the foregoing, it is accordingly and object of the invention to provide a method and a non-transitory storage medium and a gateway device for coordinating between a wireless base station of a first network and a wireless access controller of second network. The gateway device comprises a plurality of network interfaces and a scheduler. The plurality of network interfaces comprises a first network interface capable of being connected to the wireless base station and a second network interface capable of being connected to the wireless access controller. The scheduler is configured to schedule transmission of a plurality of packets based on transmission criterion associated with one or more packets from the plurality of packets. Additionally, a first set of packets scheduled to be transmitted by the wireless base station are transmitted to the wireless base station by the first network interface in a first format native to the wireless base station. Similarly, a second set of packets scheduled to be transmitted by the wireless access controller are transmitted to the wireless access controller by the second network interface in is in a second format native to the wireless access controller.

Accordingly, the above-described gateway device allows for coordination between the wireless base station and the wireless access controller. This allows for reduced interference between the wireless base station and the wireless access controller when using the unlicensed spectrum. Additionally, the gateway device is implemented outside the base station and the access controller. Accordingly, communication coordination is not dependent on the availability of the wireless base station or the wireless controller. Moreover, the gateway device is capable of communicating with the base station and wireless access controller in formats native to the corresponding base station and wireless access controller. As a result, transmission delays may be reduced further.

In an example, the plurality of packets are from an industrial network, where each packet includes a packet payload and is associated with a process in the industrial facility. In an advantageous example, the scheduler is further configured to receive a first and a second transmission schedule from the wireless base station and wireless access controller, respectively. The first transmission schedule serves for transmission of one or more packets associated with the first network. Similarly, the second transmission schedule serves for transmission of one or more packets associated with the second network. Accordingly, the gateway device can schedule transmission of the plurality of packets in accordance with the first and second transmission schedule. This allows the gateway device to coordinate packet transmission from the first network, second network and the industrial network.

In an example, the transmission criterion associated with one or more packets is related to packet redundancy. In accordance with the transmission criterion, the scheduler is configured to schedule a first set of packets for transmission using one of the wireless base station and the wireless access controller to a first end gateway device and a second set of duplicate packets for transmission using another of the wireless bas station and the wireless access controller to the first end gateway device. Accordingly, this enables packet redundancy in the industrial facility and improves network reliability.

In another example, the transmission criterion associated with one or more packets is based on one or more parameters associated with a packet from the one or more packets, where one or more parameters associated with the packet includes a packet priority, a packet size, a traffic class of the corresponding packet. Accordingly, based on the priority of packets, the scheduling of the packets may be performed by the gateway device.

In a further example, the first network interface connectable to the wireless base station is based on network Functional API (nFAPI) interface, where the second network interface that is connectable to the wireless access controller is based on industrial point coordination function (iPCF). Accordingly, existing protocols may be used for communicating with the wireless base station and the wireless access controller.

In an example, the gateway device is configured as a Redbox for enabling a Parallel Redundancy Port (PRP) configuration, between a first end gateway device capable of a PRP configuration and connected to the wireless base station and the wireless access controller, and a first industrial gateway device incapable of a PRP configuration. Accordingly, a wireless PRP configuration may be realized using the gateway device. This allows for realizing packet and network reliability.

In an advantageous example, the scheduler is further configured to detect one or more available slots and potential interferences between one or more transmissions of the wireless base station and the wireless access controller based on the first and second transmission schedules and generate a joint transmission schedule for transmission of the one or more packets associated with the first network, the one or more packets associated with the second network and the plurality of packets wherein the plurality of packets are from an industrial network. Accordingly, interference between the wireless access controller and the wireless base station is reduced while ensuring transmission of packets from the first, second and the industrial networks.

In an advantageous example, based on an acknowledgment associated with a first set of packets, the scheduler is configured to cancel the transmission of the second set of duplicate packets. Accordingly, resources may not be used in sending packets which have already been received by the first end gateway device. This allows for optimal use of network resources.

In another example, the first set of packets are scheduled to be transmitted using one of the wireless base station and the wireless access controller to the first end gateway device over a first frequency spectrum and the second set of duplicate packets are scheduled to be transmitted using another of the wireless base station and the wireless access controller to a first end gateway device over a second frequency spectrum. Accordingly, the likelihood of the first and second sets of packets sent to the first end gateway device is improved as the likelihood of an interference across both the first and second frequency spectrums is low.

It is also an object of the invention to provide a method for coordinated transmission of a plurality of packets from an industrial network, using a wireless base station of a first network and a wireless access controller of second network. The method comprises connecting to the wireless base station via a first network interface and to the wireless access controller via a second network interface; receiving a first transmission schedule and a second transmission schedule, where the first transmission schedule is associated with transmission of one or more packets associated with the first network, and is indicative of a transmission priority, transmission interval, a transmission bandwidth associated with a packet from the one or more packets associated with the first network and where the second transmission schedule is associated with transmission of one or more packets associated with the second network, and is indicative of a transmission priority, transmission interval, a transmission bandwidth associated with a packet from the one or more packets associated with the second network; generating a joint transmission schedule based on the first transmission schedule, the second transmission schedule and a transmission criterion associated with one or more packets from the plurality of packets from the industrial network; and scheduling transmission of a first set of packets on the wireless base station and a second set of packets on the wireless access controller based on the generated joint transmission schedule.

It is also an object of the invention to provide a non-transitory storage medium for coordinated transmission of a plurality of packets from an industrial network, using a wireless base station of a first network and a wireless access controller of second network. The non-transitory storage medium comprises a plurality of program instructions, which when executed on one or more processors cause the processors to connect to the wireless base station via a first network interface and connect to the wireless access controller via a second network interface; receive a first transmission schedule and a second transmission schedule, where the first transmission schedule is associated with transmission of one or more packets associated with the first network, and is indicative of a transmission priority, transmission interval, a transmission bandwidth associated with a packet from the one or more packets associated with the first network and where the second transmission schedule is associated with transmission of one or more packets associated with the second network, and is indicative of a transmission priority, transmission interval, a transmission bandwidth associated with a packet from the one or more packets associated with the second network; generate a joint transmission schedule based on the first transmission schedule, the second transmission schedule and a transmission criterion associated with one or more packets from the plurality of packets from the industrial network; and schedule transmission of a first set of packets on the wireless base station and a second set of packets on the wireless access controller based on the generated joint transmission schedule. The advantages of the gateway device and corresponding examples are also applicable to the method and the non-transitory storage medium.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The following detailed description references the drawings, in which.

DETAILED DESCRIPTION OF THE EXEMPLARY EMBODIMENTS

Figure 1:
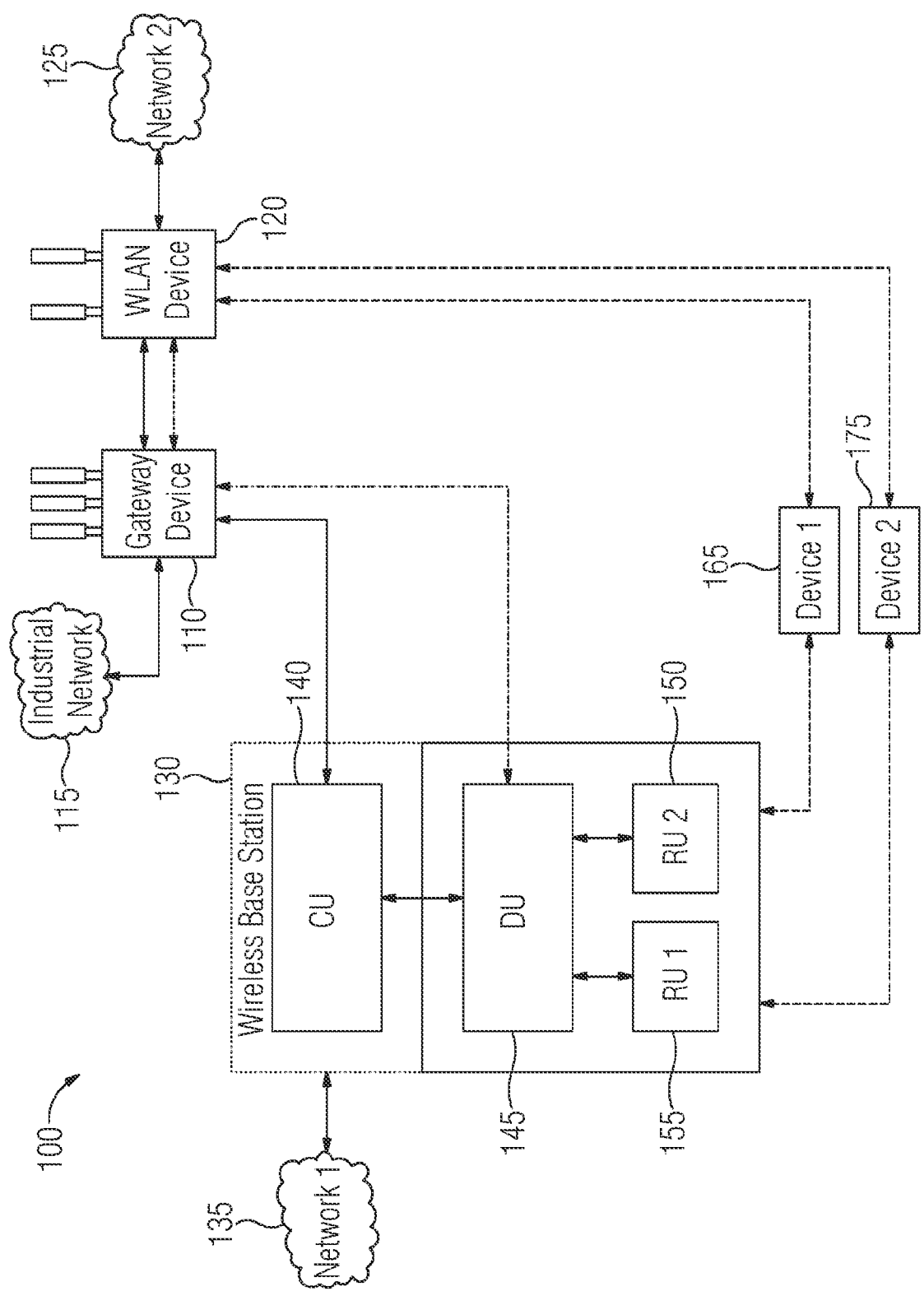
FIG. 1 illustrates an exemplary section of an exemplary industrial network comprising a gateway device for coordination with a wireless base station and a wireless access controller in accordance with the invention.

FIG. 1 illustrates an exemplary section 100 of an exemplary industrial network in an industrial facility. Industrial facility herein refers to any environment where one or more industrial processes such as manufacturing, refining, smelting, assembly of equipment may take place and includes process plants, oil refineries, and/or automobile factories. The industrial facility may comprise a plurality of control devices connected to a plurality of field devices for monitoring and regulating one or more industrial processes in the industrial facility. Industrial network herein refers to any electronic data network and accordingly includes office campus networks, industrial automation networks, private radio networks, and any other high availability networks where redundancy is critical.

The section 100 comprises a gateway device 110 for coordinating with a wireless base station 130 and a wireless access controller 120 for transmitting a plurality of packets from a section of industrial network 115 (for simplicity referred to as industrial network 115 hereafter) to one or more end devices (165, 175). The plurality of packets from the industrial network 115 is from one or more industrial devices (e.g., control devices, field device, and/or industrial computers) of the industrial facility. Accordingly, each packet from the plurality of packets includes a packet payload associated with a process in the industrial facility (also referred to as industrial plant).

The wireless base station 130 forms part of a cellular network 135 (shown as network 1). In an example, the wireless base station 130 is a part of a public cellular network. In another example, the wireless base station 130 is a part of a non-public network. The wireless base station 130 comprises a central unit 140, one or more distributed units (shown in FIG. 1 as distributed unit 145), and one or more radio units (shown in FIG. 1 as radio units 150, 155). In an example, the central unit 140 processes non-real time protocols and services, and the distributed unit 145 processes physical level protocols and latency-critical real time services. The radio units (150, 155) implement link layer and physical layer signal processing when transmitting and receiving radio signals. The connections between the various radio units (155, 165) and the distributed unit 140 are based on Ethernet. Similarly, the connection between the distributed unit 145 and the central unit 140 is based on Ethernet. Packets processing occurs in accordance with the radio protocol stack. In an example, the radio protocol stack comprises of Service Data Adaptation Protocol (SDAP), Packet Data Convergence Protocol (PDCP), Radio Link Control protocol (RLC), Media Access Control protocol (MAC) and one or more physical layer protocols. Entry to packet processing begins at the SDAP level prior to transmission.

Similarly, the wireless access controller 120 forms part of a wireless local area network (WLAN network 125, shown in figure as network 2). Packet processing is implemented in accordance with the IP stack. In an example, packet processing is implemented in accordance with IP protocol. The wireless access controller 120 includes a scheduler for scheduling transmission of packets from the second network 125. Accordingly, the scheduler of the wireless access controller 120 generates and maintains a second transmission schedule for transmission of the packets from the second network 125.

The gateway device 110 comprises one or more network interfaces and a scheduler. The one or more network interfaces includes a first network interface for connecting the gateway device 110 to the wireless base station 130 and a second network interface for connecting the gateway device 110 to the wireless access controller 120. In an example, the first network interface connectable to the wireless base station 130 is based on network Functional API (nFAPI) interface. In an example, the second network interface connectable to the wireless access controller 120 is based on industrial point coordination function (iPCF).

In an example, the first and second network interfaces of the gateway device 110 connects to the control and data planes of the wireless base station 130 and the wireless access controller 120.

Figure 7:
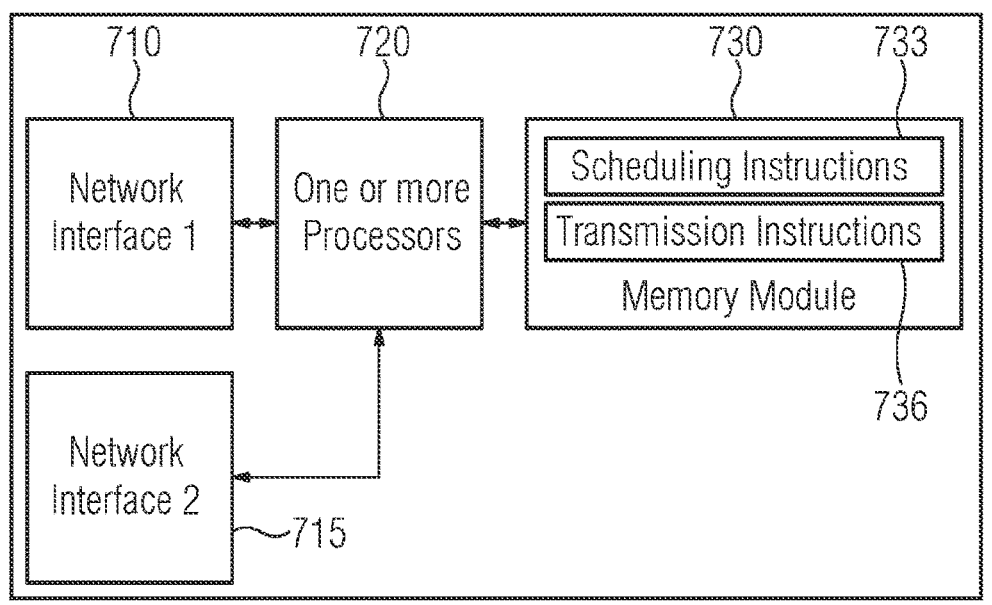
FIG. 7 illustrates an exemplary gateway device for coordination between the wireless base station and the wireless access controller in accordance with the invention.

An exemplary device configuration is illustrated in FIG. 7. As shown in FIG. 7, the exemplary gateway device 710 comprises network interfaces 710 and 715 for connecting to the wireless base station 130 and the wireless access controller 120. The scheduler is implemented in the exemplary gateway device 710 via one or more processors 720 and a memory module 730.

In an embodiment, the circuitry associated with one or more network interfaces and the scheduler are housed in the same housing and are powered by a common first power source (not shown in figures).

The scheduler of the gateway device 110 is configured to schedule transmission of the plurality of packets from the industrial network 115 using the wireless base station 130 or the wireless access controller 120 to the one or more end devices (165, 175). This is explained in relation to FIG. 2.

Figure 2:
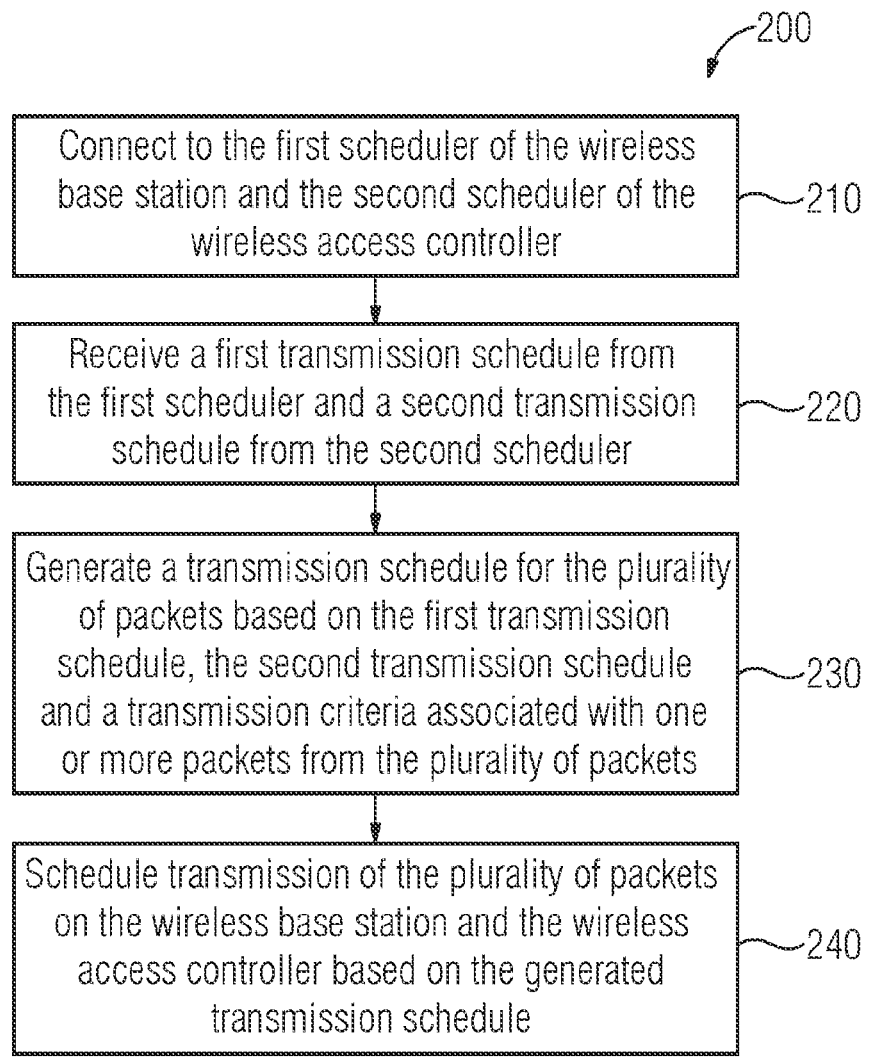
FIG. 2 illustrates an exemplary method for coordinating transmission of a plurality of packets using the wireless base station and the wireless access controller in accordance with the invention.

FIG. 2 illustrates a method 200 for coordinated transmission of the plurality of packets from the industrial network 115 using the wireless base station 130 of the first network 135 and the wireless access controller 120 of the second network 125. The method 200 is realized by the gateway device 110.

At step 210, the gateway device 110 connects to the wireless base station 130 via the first network interface and to the wireless access controller 120 via the second network interface. In an example, the gateway device 110 is connected to the distributed unit 145 of the base station 130 for receiving control and scheduling information associated with the base station 130. Additionally, the gateway device 110 is connected to the central unit 140 for transmitting packets from the industrial network 115 via the wireless base station 130.

At step 220, the gateway device 110 receives the first transmission schedule and a second transmission schedule from the wireless base station 130 and the wireless access controller 120. The first transmission schedule is associated with transmission of one or more packets from the first network 135. Similarly, the second transmission schedule is associated with transmission of one or more packets from with the second network 125. In an example, the gateway device 110 receives the first transmission schedule associated with the wireless base station 130 from a first scheduler of the distributed unit 145 of the wireless base station 130.

The first transmission schedule is indicative of one or more of a transmission priority, transmission interval, a transmission bandwidth associated with a packet from the one or more packets associated with the first network 135, and a corresponding end device to which a transmission is scheduled. In an example, the first transmission schedule is a resource allocation table including one or more resource reservation blocks against end devices for a period of time. The resource allocation table is generated based on the packets to be sent to the end devices from the first network 135.

Figure 3:
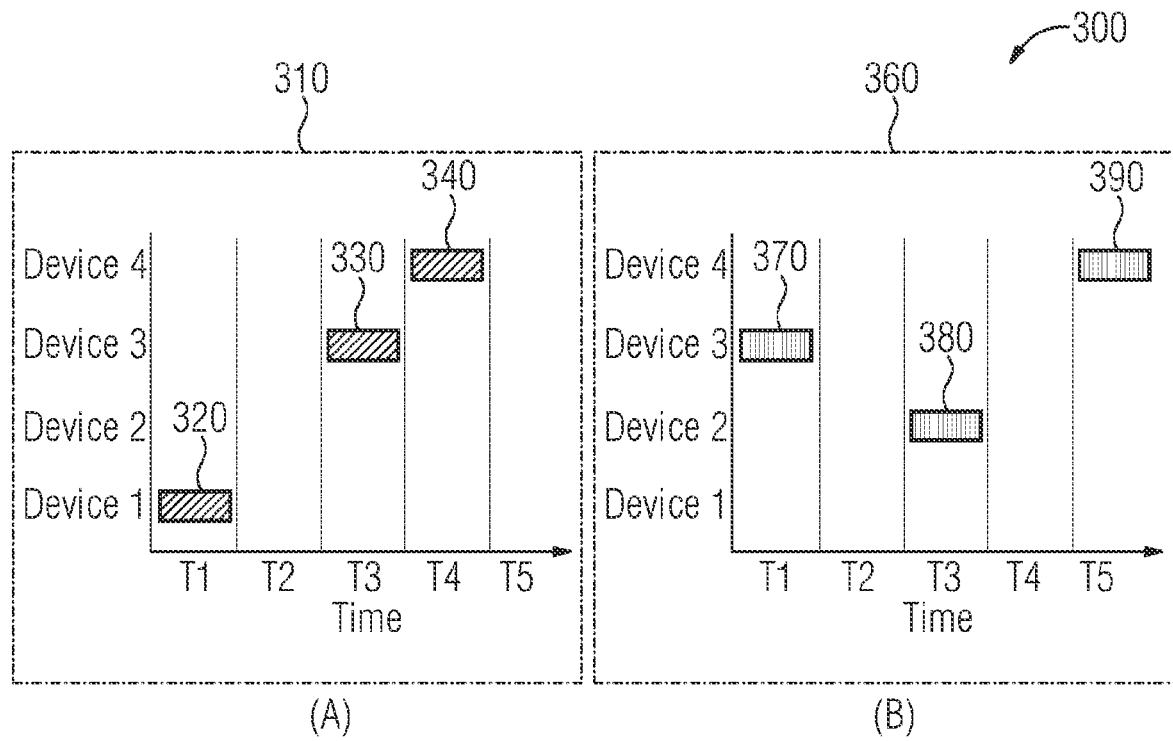
FIG. 3 illustrates an exemplary resource allocation table associated with the wireless base station and an exemplary resource allocation table associated with the wireless access controller in accordance with the invention.

An exemplary first transmission schedule is illustrated in section A of FIG. 3. The first transmission schedule 310 is generated for reservation of resources against four devices (shown as devices 1, 2, 3 and 4 in the schedule or table 310). The first transmission schedule 310 comprises five time slots T1, T2, T3, T4 and T5. In the first time slot T1, the radio resources of the wireless base station 130 are reserved for transmission of a first group of packets (having high priority) from the first network 135 against Device 1. This is shown using resource reservation block 320. In the second time slot T2, there are no reservations as no transmissions are to be scheduled. In the third time slot T3, the radio resources of the wireless base station 130 are reserved for transmission of a second group of packets (having low priority) from the first network 135 against Device 3. This is shown using resource reservation block 330. In the fourth time slot T4, the radio resources of the wireless base station 130 are reserved for transmission of a third group of packets (having low priority) from the first network 135 against Device 4. This is shown using resource reservation block 340. In the fifth time slot T5, there are no reservations because no transmissions are to be scheduled.

Similarly, the second transmission schedule is indicative of one or more of a transmission priority, transmission interval, a transmission bandwidth associated with a packet from the one or more packets associated with the second network 125, and a corresponding end device to which a transmission is scheduled. In an example, the second transmission schedule is a resource allocation table including one or more resource reservation blocks against end devices for a period of time. The resource allocation table is generated based on the packets to be sent to the end devices from the second network 125. In an example, the second transmission schedule is received from a second scheduler of the wireless access controller.

An exemplary second transmission schedule 360 is illustrated in section B of FIG. 3. The second transmission schedule 360 is generated for reservation of resources against four devices (shown as devices 1, 2, 3 and 4 in the schedule or table 360). The second transmission schedule 360 comprises five time slots T1, T2, T3, T4 and T5. In the first time slot T1, the radio resources of the wireless access controller 120 are reserved for transmission of a fourth group of packets (having high priority) from the second network 125 against Device 3. This is shown using resource reservation block 370. In the second time slot T2, there are no reservations because no transmissions are to be scheduled. In the third time slot T3, the radio resources of the wireless access controller 120 are reserved for transmission of a fifth group of packets (having medium priority) from the second network 125 against Device 2. This is shown using resource reservation block 380. In the fourth time slot T4, there are no reservations because no transmissions are to be scheduled. In the fifth time slot T5, the radio resources of the wireless access controller 120 are reserved for transmission of a sixth group of packets (having low priority) from the second network 125 against Device 4. This is shown using resource reservation block 390.

At step 230, the gateway device 110 (i.e., the scheduler of the gateway device 110) generates a joint transmission schedule based on the first transmission schedule, the second transmission schedule and transmission criterion associated with one or more packets from the plurality of packets from the industrial network. Transmission criterion herein refers to a configuration or scheme according to which transmission of the corresponding packet is performed by either of the wireless base station 130 or the wireless access controller 120. In an example, the transmission criterion associated with one or more packets is based on one or more parameters associated with a packet from the one or more packets. Examples of the one or more parameters includes a packet priority, a packet size, a traffic class of the corresponding packet.

Figure 4:
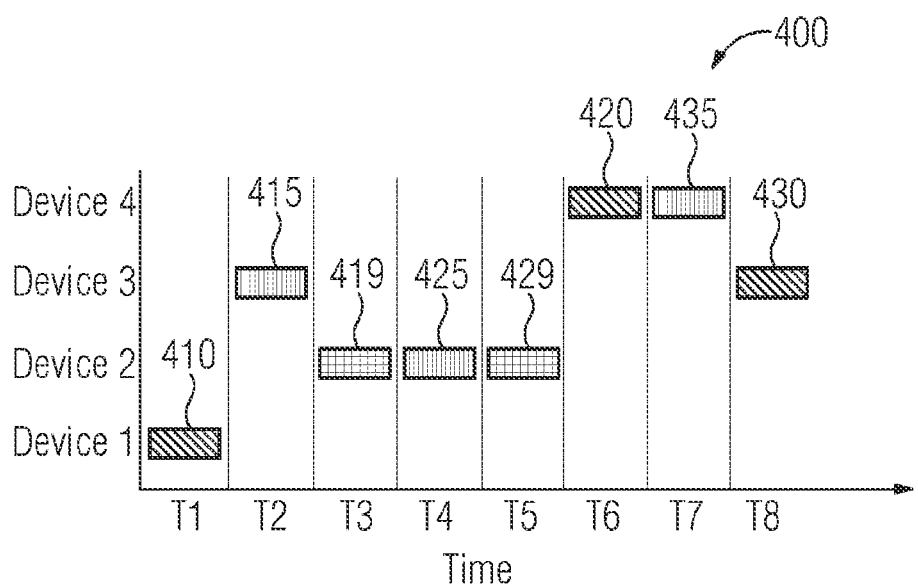
FIG. 4 illustrates an exemplary joint resource allocation table in accordance with the invention.

FIG. 4 illustrates an exemplary joint transmission schedule 400 generated by the scheduler of the gateway device 110. The joint transmission schedule 400 is generated based on the first transmission schedule 310, the second transmission schedule 360 and the transmission criterion associated with the one or more packets from the plurality of packets from the industrial network 115. The joint transmission schedule 400 is generated for reservation of resources against four devices (shown as devices 1, 2, 3 and 4 in the schedule or table 400). The joint transmission schedule 400 comprises eight time slots T1, T2, T3, T4, T5, T6, T7 and T8. The joint transmission schedule 400 further comprises of resource reservation blocks (shown as blocks 410, 415, 419, 425, 429, 420, 435, 430). Resource reservation blocks 410, 420, 430 are associated with packet transmission from first network 135 (illustrated in the figure as blocks with angular hatching). Similarly, resource reservation blocks 415, 425, 435 are associated with packet transmission from the second network 125 (illustrated in the figure as blocks with vertical shading). Additionally, resource reservation blocks 419, and 429 are associated with packet transmission (i.e., the plurality of packets) from industrial network 115 (illustrated in the figure as blocks with cross hatching).

As mentioned previously, the joint transmission schedule 400 is generated by the scheduler of the gateway device 110. Continuing the example, the scheduler of the gateway device 110 analyses the first transmission schedule 310 and the second transmission schedule 360. The scheduler of the gateway device 110 detects one or more available slots where no reservations have been made. For example, by analyzing the first and second transmission schedules 310 and 360, the scheduler of the gateway device 110 identifies slots T2 and T5 as available in the first transmission schedule 310 and slots T2 and T4 as available in the second transmission schedule 360. The scheduler of the gateway device 110 then checks the priority of the groups of packets for which resources are reserved, against the priority of the plurality of packets from the industrial network 115. In the current example, the transmission criterion associated with one or more packets from plurality of packets from industrial network 115, is a transmission priority (also referred to as priority) associated with each packet. In the current example, a high-medium-low priority scheme is used for scheduling the transmission of packets.

Accordingly, the scheduler of the gateway device 110 compares the priority of the first, second and third group of packets (of the first network 135) with the priority of the plurality of packets from the industrial network 115. Similarly, the scheduler of the device 110 compares the priority of the fourth, fifth and sixth group of packets (of the second network 125) with the priority of the plurality of packets from the industrial network 115. In the current example, the plurality of packets from the industrial network 115 (for simplicity referred to as industrial packets hereinafter) comprises a first sub-group of industrial packets of high priority and a second sub-group of industrial packets of medium priority.

Based on the check of priorities and available time slots, the scheduler of the gateway device 110 reserves resources of the wireless base station for transmission of first group of packets from the first network 135 to the device 1, because the first group of packets has high priority. This is shown as resource reservation block 410. The scheduler of the gateway device 110 then reserves resources of the wireless access controller for transmission of fourth group of packets from the second network 125 to the device 3, because the fourth group of packets has high priority. This is shown as resource reservation block 415. The scheduler of the gateway device 110 then reserves resources of the wireless base station 130 for transmission of first sub-group of industrial packets from the industrial network 115 to the device 2, because the first sub-group of packets has high priority. This is shown as resource reservation block 419. The scheduler of the gateway device 110 then reserves resources of the wireless access controller 120 for transmission of fifth group of packets from the second network 125 to the device 2, because the fifth group of packets has medium priority. This is shown as resource reservation block 425. The scheduler of the gateway device 110 then reserves resources of the wireless access controller 120 for transmission of second sub-group of industrial packets from the industrial network 115 to the device 2, because the first sub-group of packets has medium priority. This is shown as resource reservation block 429. The second group of packets from first network 135, sixth group of packets from the second network 125 and third group of packets from the first network 135 are then scheduled by reserving resources in the remaining time slots (shown as blocks 420, 435, 430).

At step 240, the scheduler of the gateway device 110 schedules the transmission of the plurality of packets of the industrial network 115 on the wireless base station 130 and the wireless access controller 120 based on the generated joint transmission schedule 400. Continuing the above example, the scheduler of the gateway device 110 transmits the joint transmission schedule 400 to wireless base station 130 and the wireless access controller 120. The gateway device 110 then sends the first sub-group of industrial packets to the wireless base station 130. Prior to sending the first sub-group of industrial packets to the wireless base station 130, the gateway device 110 converts or encapsulates the first sub-group of industrial packets from an industrial protocol to a corresponding protocol of the radio protocol stack associated with the wireless base station 130. In an example, the packets are converted to SDAP SDUs (Service Data Adaptation Protocol Service Data Unit) or PDCP PDUs (Packet Data Convergence Protocol Data Units). Similarly, the gateway device 110 transmits the second sub-group of industrial packets to the wireless access controller 120. Prior to sending the second sub-group of industrial packets, the gateway device 110 converts or encapsulates) the second sub-group of industrial packets from an industrial protocol to a corresponding protocol of the TCP/IP stack associated with the wireless base station 130. In an example, the industrial packets are converted to IP packets. Subsequently, the first sub-group and the second sub-group of industrial packets are sent via the wireless base station 130 and the wireless access controller 120 in accordance to the generated schedule 400.

In an embodiment, in cases of low memory devices, the scheduler of the gateway device 110 analyses the first and second transmission schedules 310 and 360 and determines one or more open slots. Then, the scheduler of the gateway device 110 schedules the transmission of the industrial packets in the available time slots where no other transmissions are scheduled. For example, the industrial packets are scheduled for transmission in the time slot T2 because no transmissions are scheduled in time slot T2.

In yet another embodiment, the scheduler of gateway device 110 is configured to detect one or more potential interferences between one or more transmissions of the wireless base station 130 and the wireless access controller 120 based on the first and second transmission schedule (310 and 360).

For example, the scheduler of the gateway device 110 can analyze the first transmission schedule 310 and the second transmission schedule 360 and detects a potential interference in time slots T1 and T3. In time slot T1, a potential transmission from wireless base station 130 to the device 1 and potential transmission from the wireless access controller 120 to the device 3 are scheduled. Accordingly, a potential interference may occur. Similarly, in time slot T3, a potential transmission from wireless base station 130 to the device 3 and potential transmission from the wireless access controller 120 to the device 2 are scheduled. Therefore, a potential interference may occur. Accordingly, while generating the joint transmission schedule 400, the scheduler of the gateway device 110, avoids the potential interference by ensuring that only one of the wireless base station 130 or wireless access controller 120 is transmitting in a particular time slot.

While the above example is explained using potential interference due to transmissions in the same time slot, the scheduler of the device 110 is configured to detect conflicting transmissions in the same time slot to the same end device or using the same radio resources. Accordingly, in cases of conflicts in relation to frequency resources, the scheduler can schedule transmission of the base station 130 on a first frequency and transmission of the wireless access controller 120 on a second frequency in the same time slot.

In an embodiment, the gateway device 110 is capable of providing packet redundancy for the industrial packets. This is further explained in reference to FIG. 5.

Figure 5:
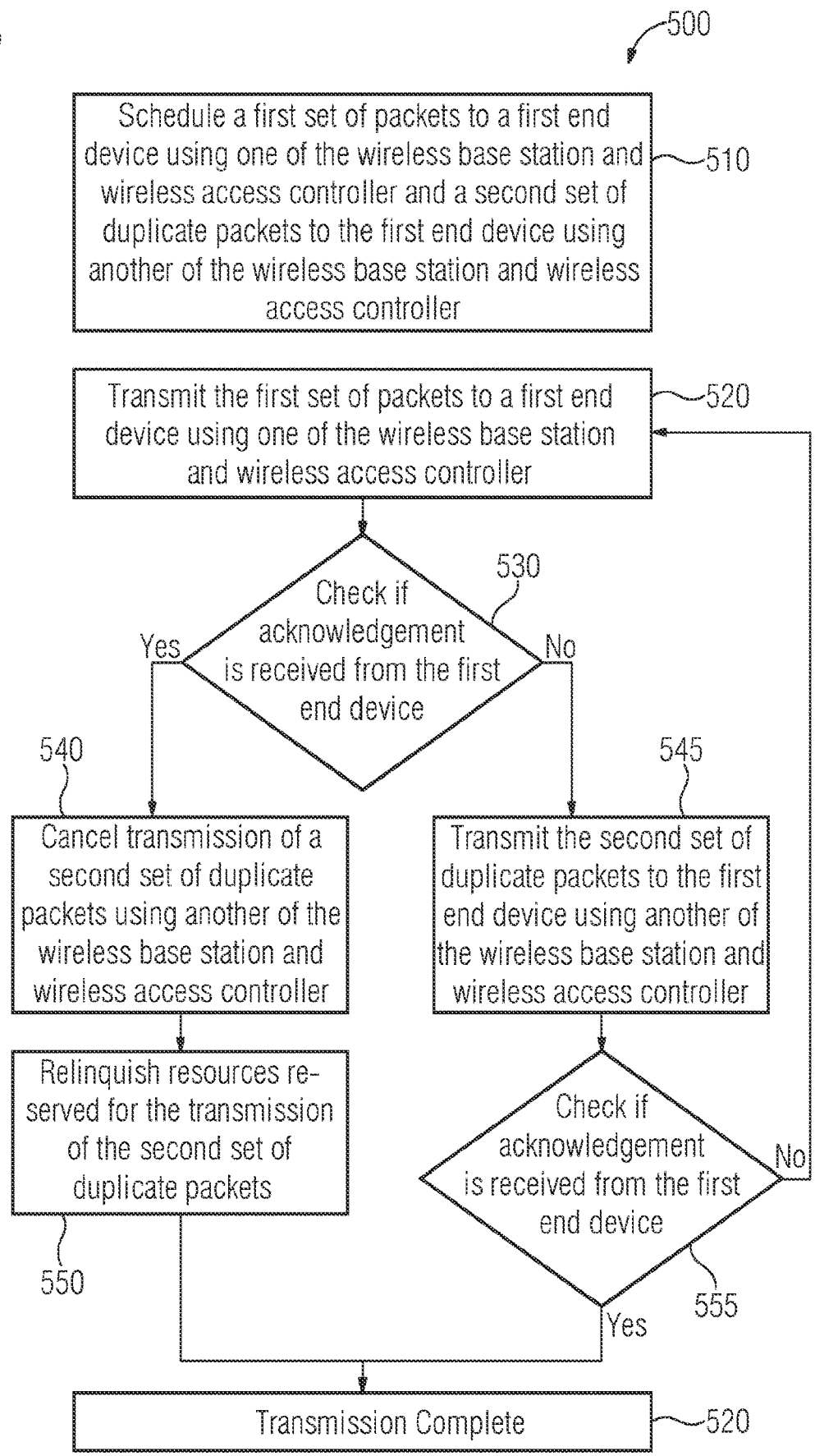
FIG. 5 illustrates an exemplary method for redundant packet transmission using the wireless base station and the wireless access controller in accordance with the invention.

FIG. 5 illustrates an exemplary method 500 for redundant packet transmission using the wireless base station 130 and the wireless access controller 120. In the current example, for one or more packets associated with the plurality of packets from the industrial network 115, the transmission criterion is indicative of packet redundancy requirement associated with the one or more packets. In other words, for each packet from the one or more packets, two equivalent packets are transmitted to the recipient end device via two separate communication paths.

Accordingly, the scheduler of the device 110 in accordance with the transmission criterion of the one or more packets, is configured to duplicate the one or more packets marked for packet redundancy and create a first set of (original) packets and a second set of duplicate packets. At step 510, the scheduler of the device 110 then schedules the first set of packets for transmission using one of the wireless base station 130 and the wireless access controller 120 to a first end device 165 and a second set of duplicate packets for transmission using another of the wireless bas station 130 and the wireless access controller 120 to the first end device 165.

At step 520, the first set of packets is then transmitted using one of the wireless base station 130 and the wireless access controller 120 to a first end device 165 over a first frequency spectrum. Subsequent to the transmission of the first set of packets via one of the wireless base station 130 and the wireless access controller 120, at step 530 the scheduler of the gateway device 110, checks to see if an acknowledgement of the transmission of the first set of (duplicate) packets has been received from the first end device. If the acknowledgement has been received from the first end device, then at step 540, the scheduler of the device 110 cancels the scheduled transmission of the second set of duplicate packets via the other of the wireless base station 130 and the wireless access controller 120. Next, at step 550, the scheduler of device 110 relinquishes the resource reservations made at the other of wireless base station 130 and the wireless access control 120. The relinquished radio resources may be then used by the other of the wireless base station 130 or the wireless access controller to schedule and transmit packets from its corresponding network (i.e., the first network for the wireless base station and the second network for the wireless access controller). The transmission of the one or more packets is deemed then complete at step 560.

If the acknowledgement is not received, then at step 545, the scheduled transmission of the second set of duplicate packets happens via the other of the wireless base station 130 or the wireless access controller 120. Next, at step 555, the scheduler again checks whether an acknowledgement has been received for either the first set of duplicate packets or the second set of duplicate packets from the first end device. If an acknowledgment has been received, then the transmission of the one or more packets is deemed complete at step 560. If no acknowledgement has received, then the scheduler restarts the method 500 and attempts to retransmit the first set of packets.

In an example, the second set of duplicate packets scheduled to be transmitted using another of the wireless base station 130 and the wireless access controller 120 to a first end device 165 over a second frequency spectrum different from a first frequency spectrum (associated with the transmission of the first set of packets) to improve packet delivery. The likelihood of interference across to different frequency spectrums is less. Consequently, the probability of packet delivery is increased.

Figure 6:
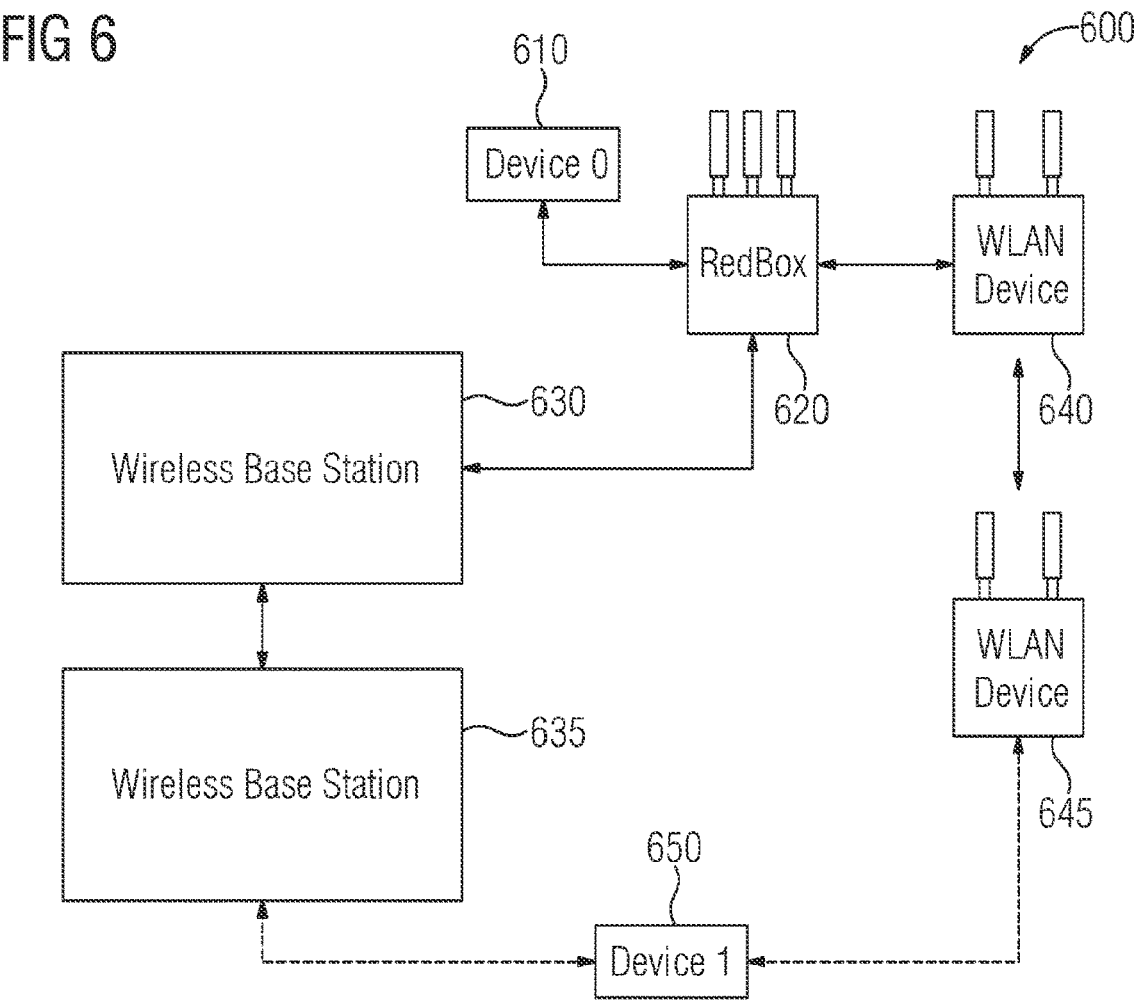
FIG. 6 illustrates an exemplary red box configuration using the wireless base stations and the wireless access controllers in accordance with the invention.

In yet another example, the gateway device 110 is capable of a red box configuration. FIG. 6 illustrates a network segment comprising a gateway device 620 (similar to the device 110). The device 620 is connected to an industrial device 610. The industrial device 610 has only a single port for connection and therefore is incapable of supporting a PRP configuration. Accordingly, PRP configuration for the industrial device 610 is provided by the device 620.

Additionally, the gateway device 620 is connected to the first end device 650 via wireless base station (or UE) 630 and (or UE) 635 of a first network and via wireless access controllers 640 and 645 of a second network. The first network is a cellular network and the second network is a WLAN network. For enabling a PRP configuration between the industrial device 610 and the first end device 650, the gateway device 620 creates a first VLAN between wireless base stations 630, 635 and the end device 650. Similarly, the gateway device 620 creates a second VLAN between wireless access controllers 640, 645 and the end device 650. Upon receiving packets from the packets from the industrial device 610, the gateway device 620 then performs the method 500 as explained above. These aspects are explained further in EP application EP16157779 filed on 29 Feb. 2016 by the current applicant.

In an example, the first end device 650 is capable of de-duplicating packets received from the gateway device 620 via the first and second VLANs. The first end device 650 includes a network interface capable of checking whether the packet received is a duplicate of a packet previously received by the first end device 650. If the packet is a duplicate, the packet is then discarded.

The present disclosure can take a form of a computer program product comprising program modules accessible from computer-usable or computer-readable medium storing program code for use by or in connection with one or more computers, processing units, or instruction execution system. For example, the configuration module may be realized across one or more devices.

Accordingly, the current disclosure describes a gateway device 700. The gateway device 700 is similar to the device 110 and device 620. The gateway device 700 includes two or more network interfaces 710 and 715, one or more processors 720 and a non-transitory storage medium 730. The non-transitory storage medium 730 contains a plurality of instructions (733, and 736) for coordinated transmission of a plurality of packets from an industrial network.

Upon execution of the scheduling instructions 733, the one or more processors 720 connects to the wireless base station (130) via a first network interface (710) and to the wireless access controller (120) via a second network interface (715). The one or more processors 720 then receives the first transmission schedule associated with the wireless base station and the second transmission schedule from the wireless access controller. The one or more processors 720 then generates a joint transmission schedule based on the first transmission schedule, the second transmission schedule and a transmission criterion associated with one or more packets from the plurality of packets from the industrial network. The one or more processors 720 then schedule transmission of a first set of packets on the wireless base station and a second set of packets on the wireless access controller based on the generated joint transmission schedule. Upon execution of the transmission instructions 736, the one or more processors 720 transmit the industrial packets scheduled for transmission to the corresponding wireless base station and the wireless access controller in accordance to the joint transmission schedule.

For the purpose of this description, a computer-usable or computer-readable non-transitory storage medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology can be centralized or distributed (or a combination thereof) as known to those skilled in the art.

While the current disclosure is described with references to few industrial devices, a plurality of industrial devices may be utilized in the context of the current disclosure. While the present disclosure has been described in detail with reference to certain embodiments, it should be appreciated that the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A gateway device for coordinating between a wireless base station of a first network and a wireless access controller of second network, the gateway device comprising:
    a) a plurality of network interfaces comprising a first network interface which is connectable to the wireless base station and a second network interface which is connectable to the wireless access controller;
    b) a scheduler configured to schedule transmission of a plurality of packets based on transmission criterion associated with at least one packet from the plurality of packets, the transmission criterion associated with the at least one packet one packet being related to packet redundancy;
        wherein a first set of packets scheduled to be transmitted by the wireless base station are transmitted to the wireless base station by the first network interface in a first format native to the wireless base station and a second set of packets scheduled to be transmitted by the wireless access controller are transmitted to the wireless access controller by the second network interface in is in a second format native to the wireless access controller;
        wherein the scheduler is further configured to receive first and second transmission schedules from the wireless base station and the wireless access controller, respectively;
        wherein the first transmission schedule serves for transmission of at least one packet associated with the first network;
        wherein the second transmission schedule serves for transmission of at least one packet associated with the second network;
        wherein the scheduler is further configured to detect at least one available slot and potential interferences between at least one transmission of the wireless base station and the wireless access controller based on the first and second transmission schedules and further configured to generate a joint transmission schedule for transmission of the at least one packet associated with the first network, the at least one packet associated with the second network and the plurality of packets; and
        wherein the plurality of packets originate from an industrial network.

2. The gateway device as claimed in claim 1, wherein each packet of the plurality of packets which originate from the industrial network includes a packet payload associated with a process in an industrial facility.

3. The gateway device as claimed in claim 1, wherein the scheduler, in accordance with the transmission criterion, is configured to schedule a first set of packets for transmission utilizing one of the wireless base station and the wireless access controller to a first end device and a second set of duplicate packets for transmission using another of the wireless bas station and the wireless access controller to the first end device.

4. The gateway device as claimed in claim 1, wherein the first network interface which is connectable to the wireless base station is based on network Functional API (nFAPI) interface; and wherein the second network interface which is connectable to the wireless access controller is based on industrial point coordination function (iPCF).

5. The gateway device as claimed in claim 1, wherein the gateway device is configured as a Redbox for enabling a Parallel Redundancy Port (PRP) configuration between a first end device capable of a PRP configuration and is connected to the wireless base station and the wireless access controller, and a first industrial device incapable of a PRP configuration.

6. The gateway device as claimed in claim 3, wherein the scheduler is configured to cancel the transmission of the second set of duplicate packets based on an acknowledgment associated with a first set of packets.

7. The gateway device as claimed in claim 3, wherein the first set of packets scheduled to be transmitted utilizing one of the wireless base station and the wireless access controller to a first end device over a first frequency spectrum and the second set of duplicate packets scheduled to be transmitted using another of the wireless base station and the wireless access controller to a first end device over a second frequency spectrum.

8. A method for coordinated transmission of a plurality of packets from an industrial network, utilizing a wireless base station of a first network and a wireless access controller of second network, the method comprising:
    a) connecting to the wireless base station via a first network interface and connecting to the wireless access controller via a second network interface;

b) receiving a first transmission schedule and a second transmission schedule, the first transmission schedule being associated with transmission of at least one packet associated with the first network, and being indicative of a transmission priority, transmission interval, a transmission bandwidth associated with a packet from the at least one packet associated with the first network, and the second transmission schedule being associated with transmission of at least one packet associated with the second network, and being indicative of a transmission priority, transmission interval, a transmission bandwidth associated with a packet from the one or more packets associated with the second network;

c) generating a joint transmission schedule based on the first transmission schedule, the second transmission schedule and a transmission criterion associated with at least one packet from the plurality of packets from the industrial network, the transmission criterion associated with the at least one packet being related to packet redundancy; and d) scheduling transmission of a first set of packets on the wireless base station and a second set of packets on the wireless access controller based on the generated joint transmission schedule.

9. A non-transitory storage medium for coordinated transmission of a plurality of packets from an industrial network, utilizing a wireless base station of a first network and a wireless access controller of second network, the non-transitory storage medium comprising a plurality of program instructions which, when executed on at least one processor, cause the at least one processor to:

a) connect to the wireless base station via a first network interface and connect to the wireless access controller via a second network interface;

b) receive a first transmission schedule and a second transmission schedule, the first transmission schedule being associated with transmission of at least one packet associated with the first network, and being indicative of a transmission priority, transmission interval, a transmission bandwidth associated with a packet from the at least one packet associated with the first network, and the second transmission schedule being associated with transmission of at least one packet associated with the second network, and being indicative of a transmission priority, transmission interval, a transmission bandwidth associated with a packet from the at least one packet associated with the second network;

c) generate a joint transmission schedule based on the first transmission schedule, the second transmission schedule and a transmission criterion associated with at least one packet from the plurality of packets from the industrial network, the transmission criterion associated with the at least one packet being related to packet redundancy; and d) schedule transmission of a first set of packets on the wireless base station and a second set of packets on the wireless access controller based on the generated joint transmission schedule.

* * * * *